(12) United States Patent
Wan et al.

(10) Patent No.: US 12,210,096 B2
(45) Date of Patent: Jan. 28, 2025

(54) ULTRASONIC RADAR SYSTEM

(71) Applicant: VISION AUTOMOBILE ELECTRONICS INDUSTRIAL CO., LTD., Tainan (TW)

(72) Inventors: Tien-Bou Wan, Tainan (TW); Chung-Hsiao Lo, Tainan (TW); Chien-Liang Pan, Tainan (TW); An-Hun Cheng, Tainan (TW); Chia-Hung Wu, Tainan (TW)

(73) Assignee: Vision Automobile Electronics Industrial Co., Ltd., Tainan (TW)

( * ) Notice: Subject to any disclaimer, the term of this patent is extended or adjusted under 35 U.S.C. 154(b) by 90 days.

(21) Appl. No.: 18/346,350

(22) Filed: Jul. 3, 2023

(65) Prior Publication Data

US 2024/0061110 A1 Feb. 22, 2024

(30) Foreign Application Priority Data

Aug. 17, 2022 (TW) .................................. 111131009

(51) Int. Cl.
*G01S 15/931* (2020.01)
*G08G 1/16* (2006.01)
*G01S 13/931* (2020.01)

(52) U.S. Cl.
CPC ............ *G01S 15/931* (2013.01); *G08G 1/167* (2013.01); *G01S 2013/9315* (2020.01); *G01S 2015/937* (2013.01)

(58) Field of Classification Search
CPC ........... G01S 15/931; G01S 2013/9315; G01S 2015/937; G08G 1/167
See application file for complete search history.

(56) References Cited

U.S. PATENT DOCUMENTS

| | | | | |
|---|---|---|---|---|
| 7,663,533 B2* | 2/2010 | Toennesen | ........... | H01Q 25/002 342/70 |
| 10,934,764 B2* | 3/2021 | Rafrafi | ..................... | G01S 7/415 |
| 2011/0163909 A1* | 7/2011 | Jeong | .................... | H01Q 25/002 342/374 |
| 2014/0266859 A1* | 9/2014 | Kurihara | ................. | G01S 13/87 342/70 |
| 2018/0201138 A1* | 7/2018 | Yellambalase | ........... | B60L 58/12 |
| 2019/0276013 A1* | 9/2019 | Kim | ....................... | B60W 30/09 |
| 2021/0263145 A1* | 8/2021 | Wang | ..................... | G01S 13/343 |
| 2021/0390860 A1* | 12/2021 | Kang | ....................... | G01S 7/539 |

* cited by examiner

*Primary Examiner* — Mohamed Barakat
(74) *Attorney, Agent, or Firm* — Rosenberg, Klein & Lee (57) ABSTRACT

A radar system includes an ultrasonic radar unit and a warning device. The ultrasonic radar unit is configured to be detachably mounted on a vehicle, and is configured to output a pairing signal when a pairing function is activated and output a warning signal upon detecting an object that is within a range. The warning device is configured to be electrically connected to the ultrasonic radar unit and to be mounted inside the vehicle. The warning device is configured to wirelessly communicate with the ultrasonic radar unit to receive the warning signal and the pairing signal; when receiving the pairing signal, couple the ultrasonic radar unit to one of a plurality of warning areas that is on the warning device according to the pairing signal; control one of the warning areas that is coupled to the ultrasonic radar unit to output a visual warning upon receiving the warning signal.

11 Claims, 5 Drawing Sheets

ULTRASONIC RADAR SYSTEM

CROSS-REFERENCE TO RELATED APPLICATION

This application claims priority to Taiwanese Invention Patent Application No. 111131009, filed on Aug. 17, 2022.

FIELD

The disclosure relates to a vehicle warning system, and more particularly to an ultrasonic radar system.

BACKGROUND

A large vehicle such as a cargo truck or a combination vehicle usually has many blind spots around it. A plurality of rearview mirrors having different viewing angles may be installed on the front-left and front-right sides of the large vehicle, and a rearview camera may be installed on the rear side of the large vehicle to expand a view for the driver. However, when the large vehicle is moving (e.g., moving forward, turning, or reversing), the rearview mirrors may not provide a complete view of the surroundings of the large vehicle. Even though the rearview camera is able to provide an image behind the large vehicle, a field of view of the rearview camera is limited and the image provided by the rearview camera may sometimes be unclear. In addition, the rearview camera is unable to inform the driver of presence of an obstacle, and the driver may need to determine, by looking at the rearview mirrors and the rearview camera, whether an obstacle is in the surroundings.

A conventional reversing radar (parking sensor) may be installed on the large vehicle to assist the driver with detecting obstacles, but the conventional reversing radar may only detect obstacles on the rear side of the large vehicle. If it is desired to install an additional radar on a different side of the large vehicle, the additional radar usually requires installation of a signal wire and a power cable, which may be inconvenient. In addition, once the additional radar is installed on the large vehicle, the additional radar is unable to be used by another vehicle when the large vehicle is not in service, and so yet another additional radar may need to be installed on the another vehicle, thus increasing equipment cost.

SUMMARY

Therefore, an object of the disclosure is to provide an ultrasonic radar system that can alleviate at least one of the drawbacks of the prior art.

According to the disclosure, an ultrasonic radar system adapted to be detachably mounted on a vehicle is provided. The ultrasonic radar system includes an ultrasonic radar unit and a warning device.

The ultrasonic radar unit is configured to be detachably mounted on the vehicle, and includes an ultrasonic sensor, a first communication module, a motion sensing module, a control module, and a solar power module. The ultrasonic sensor is configured to detect presence of an object within a predetermined range, and to output a sensing signal when detecting an object that is within the predetermined range. The motion sensing module is configured to detect whether the vehicle is moving and to output a trigger signal upon detecting movement of the vehicle. The control module includes an operation unit that is configured to be switched among a plurality of settings respectively corresponding to different sides of the vehicle and that is configured to be operated to activate a pairing function. The control module stores an identifier that is related and unique to the ultrasonic radar unit, and a plurality of setting parameters that correspond respectively to the settings. The control module is configured to output a pairing signal using the first communication module when the operation unit activates the pairing function, where the pairing signal includes the identifier and one of the setting parameters that corresponds to one of the settings which the operation unit is currently being switched to. The control module is further configured to activate the ultrasonic sensor upon receiving the trigger signal from the motion sensing module, and to output a warning signal using the first communication module upon receiving the sensing signal from the ultrasonic sensor, where the warning signal includes the identifier. The solar power module is configured to provide electric power to the ultrasonic sensor, the first communication module, the motion sensing module, and the control module.

The warning device is configured to be electrically connected to the ultrasonic radar unit and to be mounted inside the vehicle. The warning device includes a second communication module, a warning module, and a central control module. The second communication module is configured to wirelessly communicate with the first communication module of the ultrasonic radar unit to receive the warning signal and the pairing signal. The warning module includes a display unit that has a plurality of warning areas. The central control module stores the setting parameters that are associated respectively with the warning areas. The central control module is configured to, when receiving the pairing signal through the second communication module from the first communication module, store the identifier that is included in the pairing signal, and couple the identifier to one of the warning areas that corresponds to the setting parameter included in the pairing signal. The central control module is further configured to, upon receiving the warning signal through the second communication module from the ultrasonic radar unit, control one of the warning areas that is coupled to the identifier included in the warning signal to output a visual warning.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Referring to FIGS. 1 to 4, an ultrasonic radar system 200 adapted to be detachably mounted on a vehicle 900 is provided. The ultrasonic radar system 200 is configured to detect whether there is an object around the vehicle 900, such as detecting whether a person or an obstacle is in a driving blind spot or an inner wheel difference area of the vehicle 900. The vehicle 900 may be, for example, a large vehicle such as a cargo truck, a combination vehicle, a dump truck, a concrete transport truck, etc.

The ultrasonic radar system 200 includes an ultrasonic radar unit 3 that is configured to be detachably mounted on the vehicle 900, and a warning device 4 that is configured to be electrically connected to the ultrasonic radar unit 3 and that is to be mounted inside a cabin of the vehicle 900. Specifically, in this embodiment, the ultrasonic radar unit 3 is connected to the warning device 4 via wireless communication.

Figure 1:
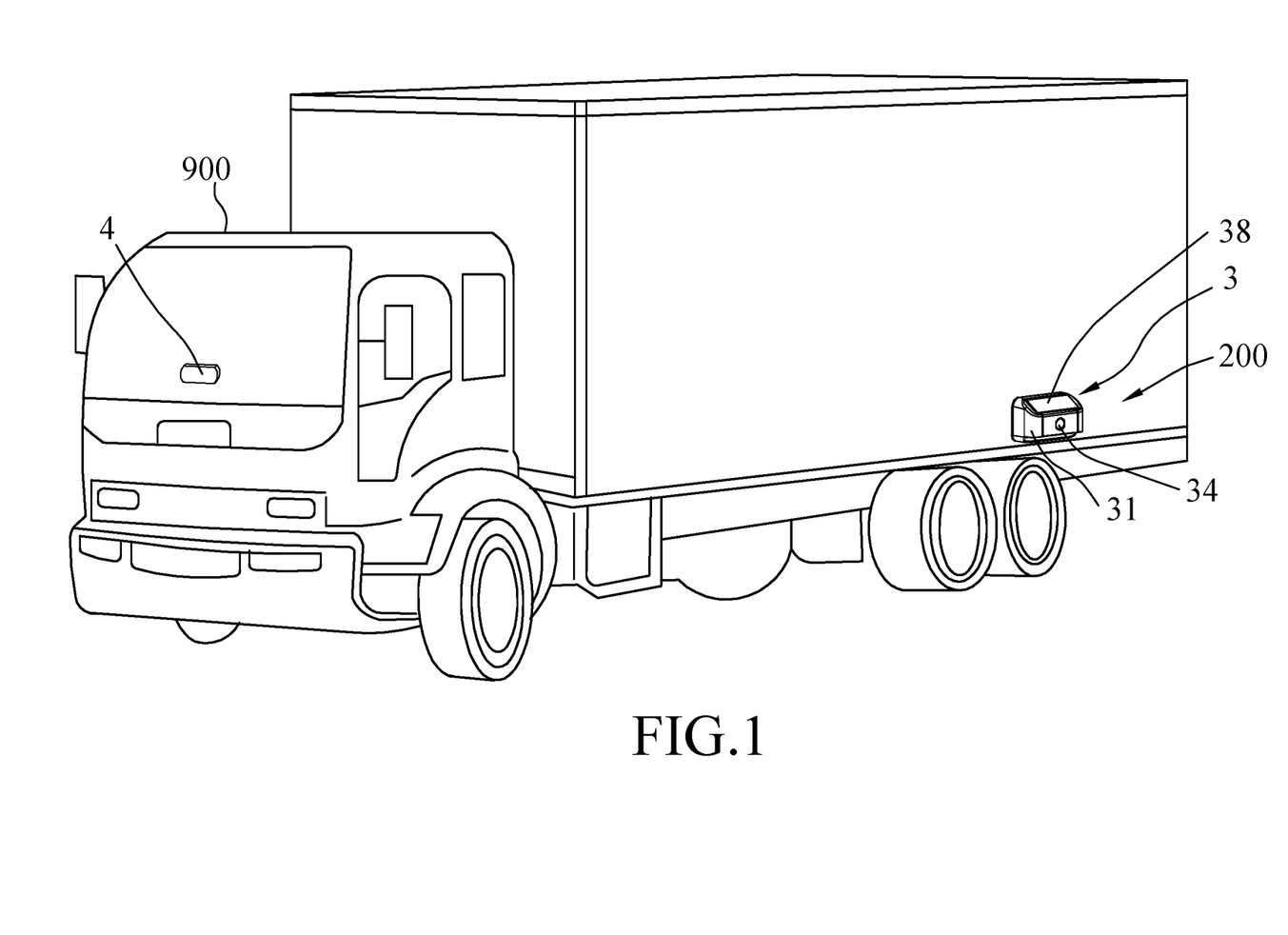
FIG. 1 is a schematic perspective view illustrating an ultrasonic radar system installed on a vehicle according to an embodiment of the disclosure.

In some embodiments, the ultrasonic radar system 200 may include a plurality of ultrasonic radar units, and the warning device 4 is configured to be electrically connected to the ultrasonic radar units. The ultrasonic radar units may be mounted on different sides of the vehicle 900 (e.g., front, left, right, or rear side of the vehicle 900). Since all of the ultrasonic radar units are identical, only one ultrasonic radar unit 3 is described in detail below.

The ultrasonic radar unit 3 includes a first housing 31, and a connecting unit 32, a reflector 33, an ultrasonic sensor 34, a first communication module 35, a motion sensing module 36, a control module 37, and a solar power module 38 that are all disposed on the first housing 31. The first housing 31 has a rear side (see FIGS. 4 and 5) and a front side (see FIG. 2) that are opposite to each other. When the ultrasonic radar unit 3 is correctly mounted on the vehicle 900, the rear side faces the vehicle 900 (i.e., the side of the first housing 31 that is in contact with the vehicle 900) while the front side faces away from the vehicle 900.

Figure 4:
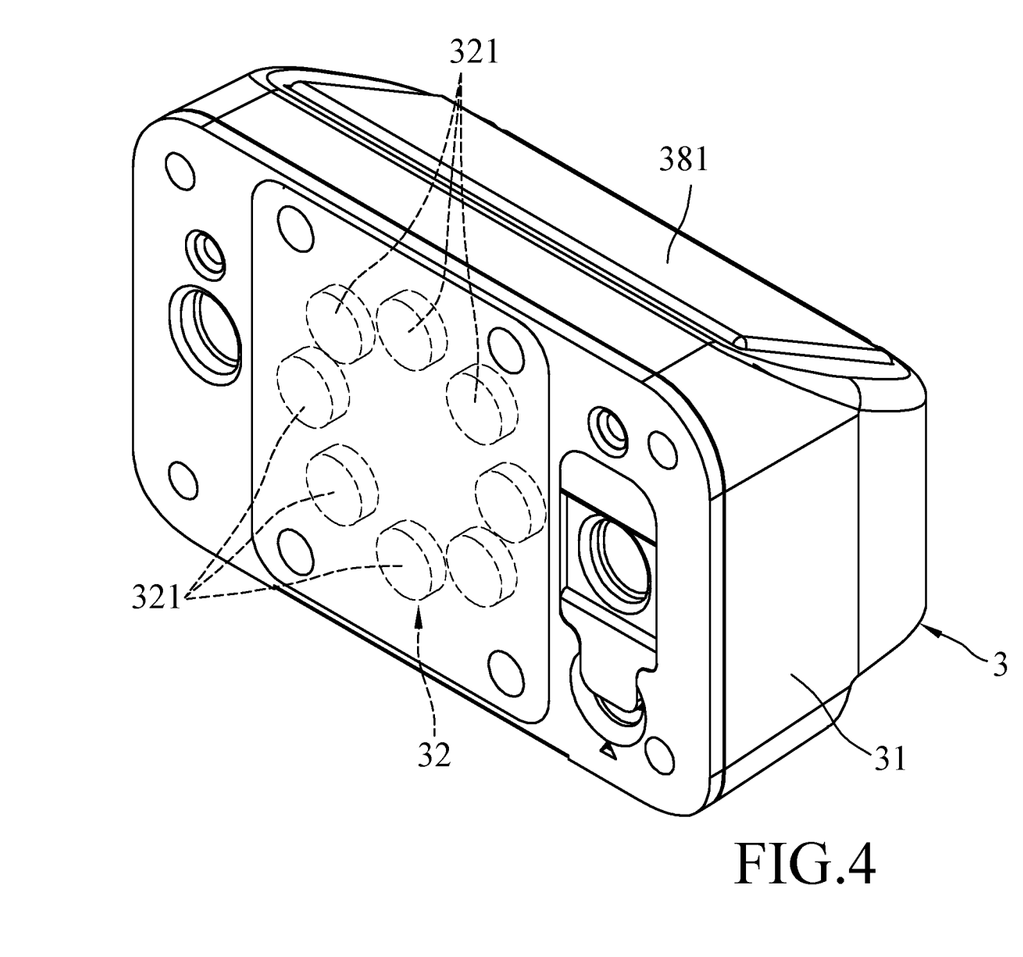
FIG. 4 is a perspective view illustrating the ultrasonic radar unit according to an embodiment of the disclosure.
Figure 5:
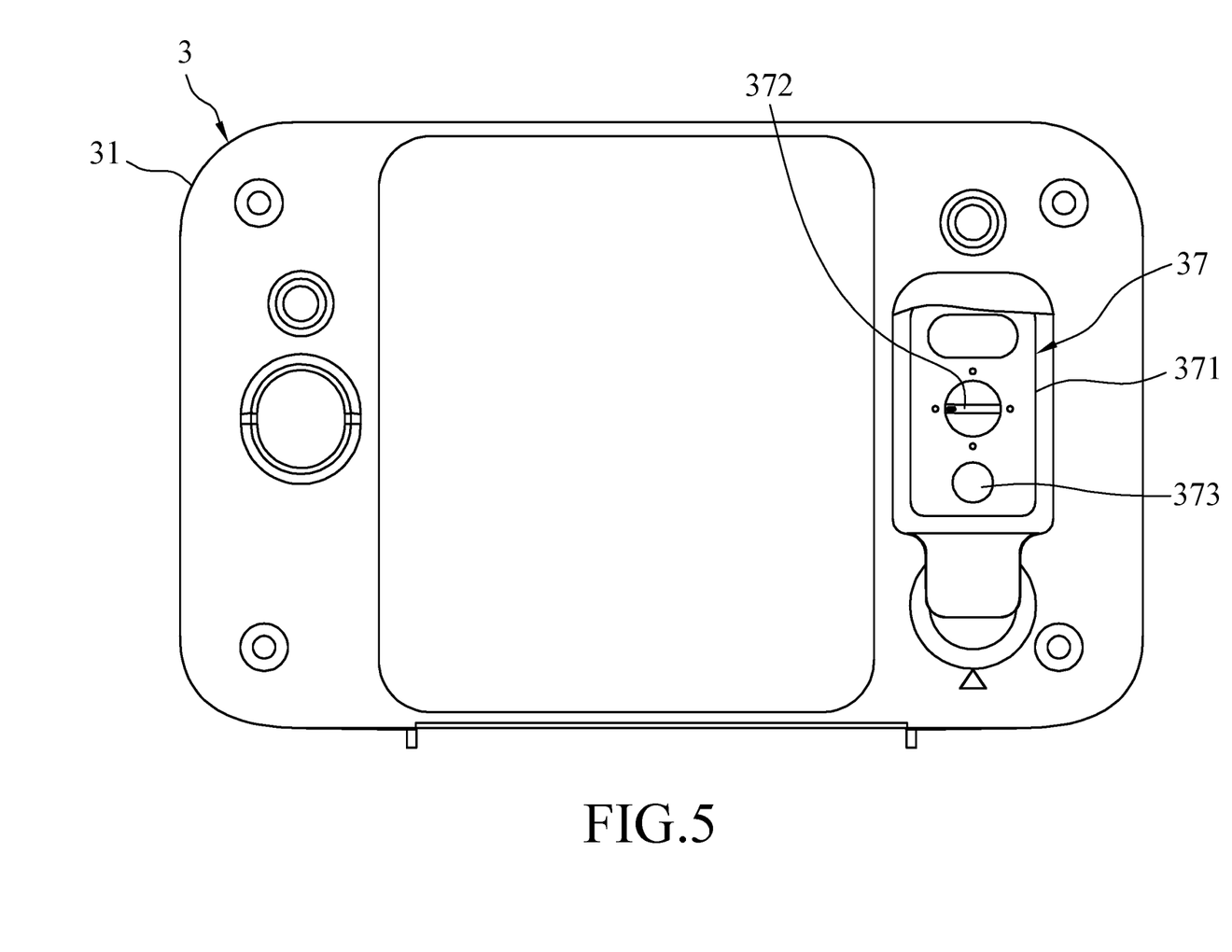
FIG. 5 is a side view of the ultrasonic radar unit according to an embodiment of the disclosure.

The connecting unit 32 includes a plurality of connectors 321. In this embodiment, each of the connectors 321 is a magnet disposed on the rear side of the first housing 31. The connectors 321 are configured to be detachably mounted on a side of the vehicle 900 by magnetic attraction, thus allowing the ultrasonic radar unit 3 to be detachably mounted on the vehicle 900 (as shown in FIG. 1). In some embodiments, only one connector 321 is disposed on the first housing 31. Since the connecting unit 32 may be in different forms to detachably mount the ultrasonic radar unit 3 on the vehicle 900, such as a zip tie, hook and loop fasteners, or a clip buckle, the connecting unit 32 should not be limited to the abovementioned examples.

Figure 2:
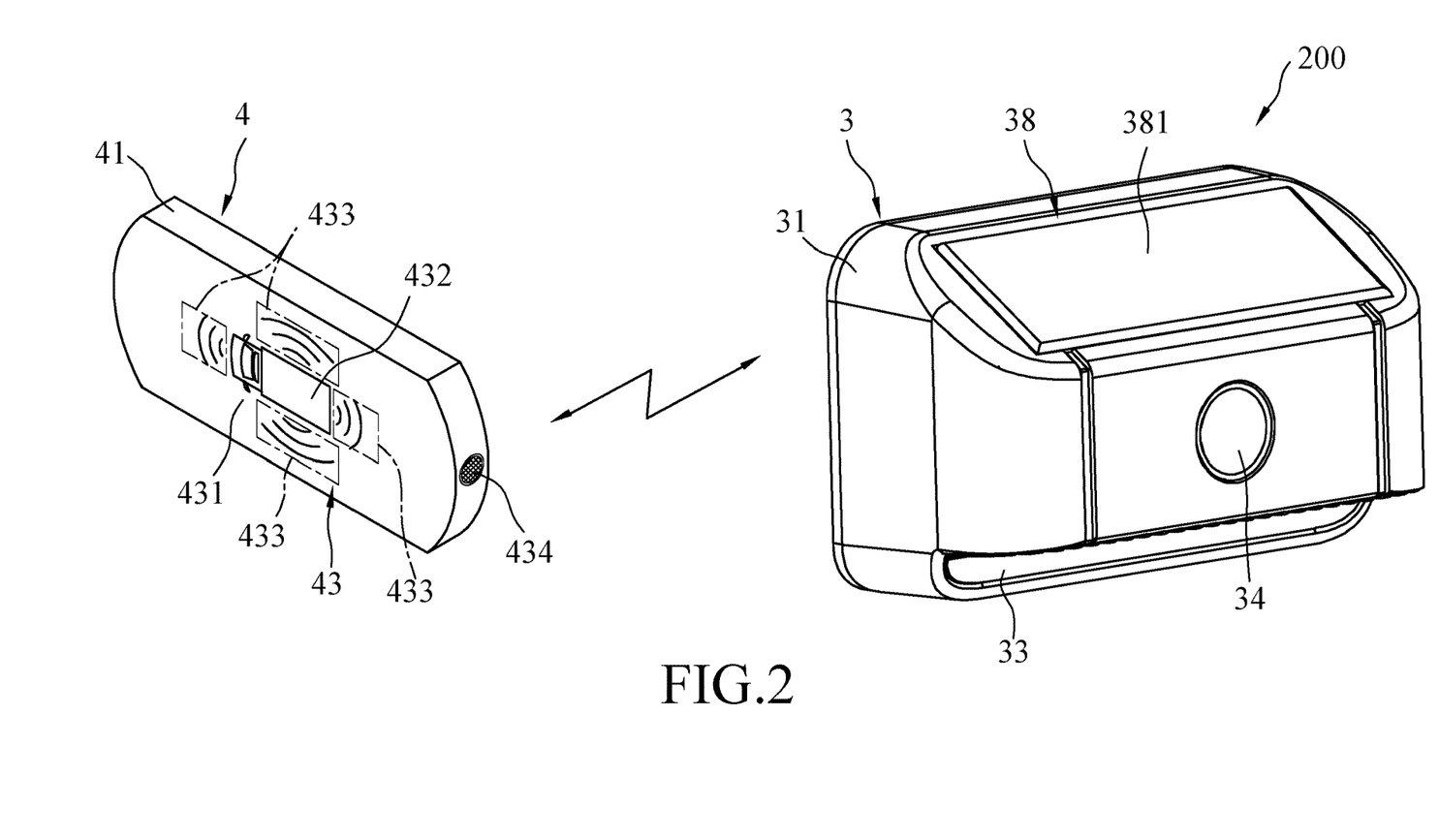
FIG. 2 is a perspective view illustrating the ultrasonic radar system including an ultrasonic radar unit and a warning device according to an embodiment of the disclosure.

The reflector 33 is configured to reflect light and is disposed on the front side of the first housing 31.

The ultrasonic sensor 34 is disposed on the front side of the first housing 31 facing away from the vehicle 900. The ultrasonic sensor 34 is configured to be activated to emit an ultrasonic signal for detecting whether there is an object present within a predetermined range (i.e., a detection range of the ultrasonic sensor 34), and is configured to output a sensing signal upon detecting presence of an object that is within the predetermined range according to a reflected ultrasonic signal. Since the ultrasonic sensor 34 used to detect objects within the predetermined range is well known to one having ordinary skill in the art, it will not be described in further detail for the sake of brevity.

Figure 3:
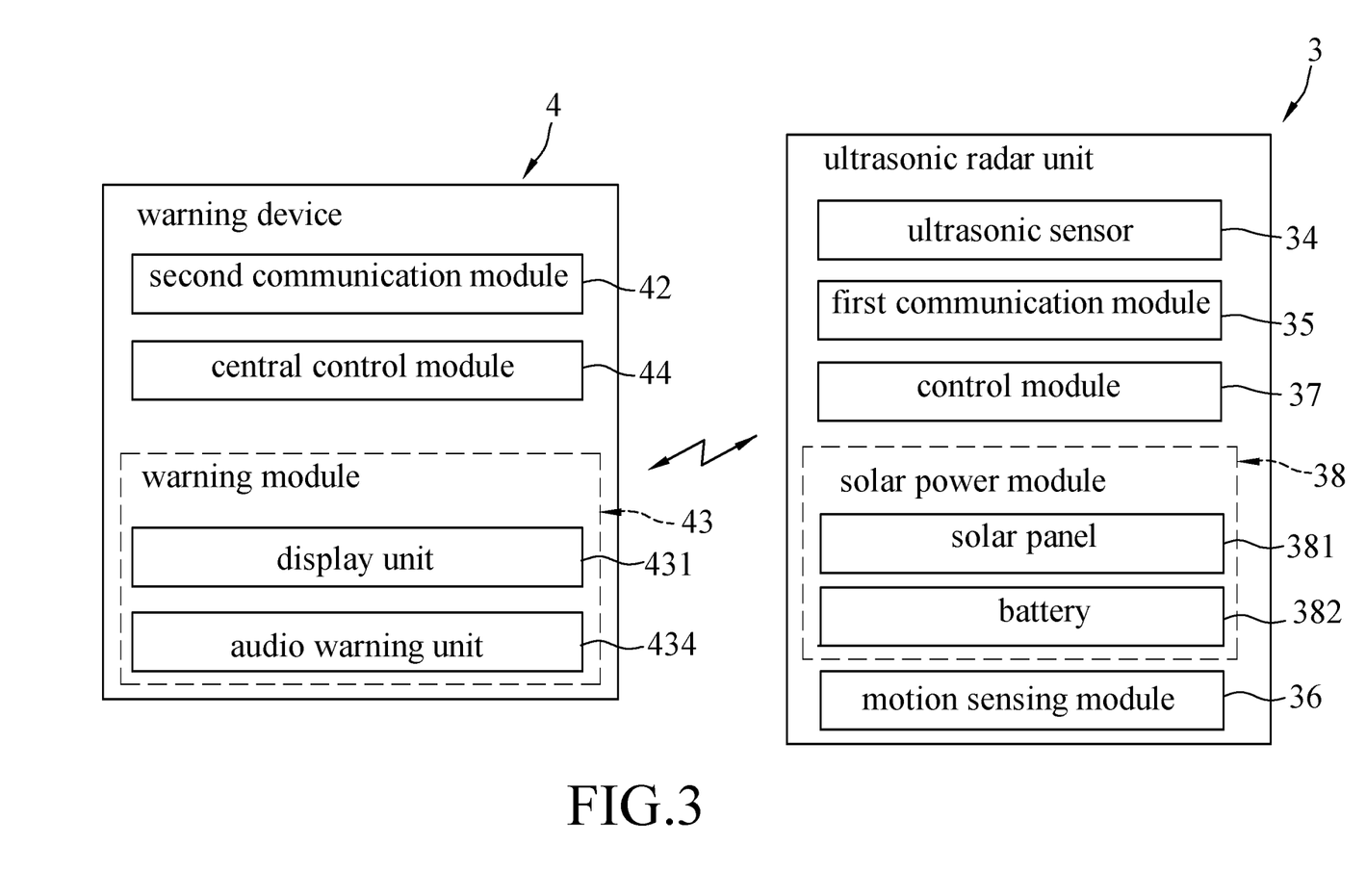
FIG. 3 is a block diagram illustrating the ultrasonic radar system according to an embodiment of the disclosure.

The first communication module 35 is configured to wirelessly communicate with the warning device 4 using a wireless communication technology, such as Bluetooth® and/or Wi-Fi, etc.

The motion sensing module 36 is configured to detect whether the vehicle 900 is moving and to output a trigger signal upon detecting movement of the vehicle 900. To be more specific, the motion sensing module 36 is capable of detecting vibration of the vehicle 900 when an engine of the vehicle 900 is operating, and the trigger signal is continuously outputted upon detecting vibration of the vehicle 900. In this embodiment, the motion sensing module 36 is configured to stop outputting the trigger signal if the motion sensing module 36 has not detected vibration of the vehicle 900 for longer than a predetermined time period (e.g., five minutes). The motion sensing module 36 may be, but not limited to, a gravity sensor that is configured to detect three-axis displacement.

Further referring to FIG. 5, the control module 37 is electrically connected to the ultrasonic sensor 34, the first communication module 35 and the motion sensing module 36, and stores an identifier that is related and unique to the ultrasonic radar unit 3. The control module 37 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), a system on a chip (SoC), etc.

The control module 37 is configured to activate the ultrasonic sensor 34 upon receiving the trigger signal from the motion sensing module 36, and to analyze the sensing signal outputted by the ultrasonic sensor 34 to obtain a distance to the object. The control module 37 is further configured to output a warning signal that includes the identifier and the distance to the object through the first communication module 35 to the warning device 4.

The control module 37 includes an operation unit 371 that is configured to be switched among a plurality of settings respectively corresponding to different sides of the vehicle 900 (e.g., front, rear, left and right sides) and that is configured to be operated to activate a pairing function. The operation unit 371 includes a knob 372 and a button 373. The knob 372 is operable to be switched among a plurality of positions corresponding respectively to the settings for switching the operation unit 371 among the settings. The button 373 is operable to activate the pairing function. The control module 37 further stores a plurality of setting parameters that correspond respectively to the settings. The control module 37 is configured to output a pairing signal using the first communication module 35 when the operation unit 371 activates the pairing function, where the pairing signal includes the identifier and one of the setting parameters that corresponds to one of the settings which the operation unit 371 is currently being switched to.

The solar power module 38 is electrically connected to and is configured to provide electric power to the ultrasonic sensor 34, the first communication module 35, the motion sensing module 36, and the control module 37. The solar panel module 38 includes a solar panel 381 that is disposed on a top outer surface of the first housing 31, and a battery 382 that is disposed inside the first housing 31 and that is electrically connected to the solar panel 381. The solar panel 381 is configured to convert energy of light directly into the electric power and to store the electric power in the battery 382.

The warning device 4 includes a second housing 41, a second communication module 42 disposed within the second housing 41, a warning module 43 disposed on an outer surface of the second housing 41, and a central control module 44 disposed within the second housing 41. The second communication module 42 is configured to wirelessly communicate with the first communication module 35 of the ultrasonic radar unit 3 to receive the warning signal and the pairing signal. In some embodiments, the warning device 4 further includes a battery (not shown) for providing electric power to the second communication module 42, the warning module 43, and the central control module 44. In some embodiments, the warning device 4 is configured to be electrically connected to an electrical system of the vehicle 900 through an automobile auxiliary power outlet or a universal serial bus (USB) socket to use electric power provided by the electrical system.

The warning module 43 includes a display unit 431 and an audio warning unit 434. The display unit 431 displays a vehicle FIG. 432, and includes a plurality of warning areas 433 that are on different sides of the vehicle FIG. 432 and that are associated with the setting parameters, respectively. Each of the warning areas 433 is configured to be controlled by the central control module 44 to output a visual warning. The display unit 431 is, for example, a light-emitting diode (LED) display, a liquid-crystal display (LCD), etc.

The audio warning unit 434 is, for example, a speaker, and is configured to be controlled by the central control module 44 to output an audio warning in one of a plurality of sound modes. The sound modes correspond to different distances to the object, and may be a beeping sound of different time intervals. For example, the shorter the distance to the object, the shorter the time interval of the beeping sound.

The central control module 44 is electrically connected to the second communication module 42 and the warning module 43, and stores the setting parameters that are associated respectively with the warning areas 433. The central control module 44 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), a system on a chip (SoC), etc. The central control module 44 is configured to, according to the pairing signal received through the second communication module 42, execute a pairing setting to pair the ultrasonic radar unit 3 to one of the warning areas 433.

To describe in further detail, to execute the pairing setting for pairing the ultrasonic radar unit 3 to one of the warning areas 433, a user has to switch the knob 372 to one of the positions that corresponds to one of the sides of the vehicle 900 where the ultrasonic radar unit 3 is desired to be mounted on, and then to operate the button 373 to activate the pairing function. For example, when the ultrasonic radar unit 3 is to be mounted on the right side of the vehicle 900, the knob 372 is to be switched to one of the positions that corresponds to one of the settings that is associated to the right side of the vehicle 900, and the button 373 is to be consecutively pressed for multiple times (e.g., two times, three times, four times, etc.) to activate the pairing function. The control module 37 then outputs the pairing signal to the central control module 44 via the first communication module 35 when the pairing function is activated. When the central control module 44 receives the pairing signal through the second communication module 42, the central control module 44 analyzes a received signal strength indication (RSSI) of the pairing signal. Only when the RSSI is greater than a predetermined value will the central control module 44 store the identifier that is included in the pairing signal and couple the identifier to one of the warning areas 433 that corresponds to the one of the setting parameters included in the pairing signal, thus pairing the ultrasonic radar unit 3 to one of the warning areas 433.

The central control module 44 is further configured to, according to the warning signal received through the second communication module 42, control the warning module 43 to operate.

To describe in further detail, upon receiving the warning signal, the central control module 44 controls one of the warning areas 433 that is coupled to the identifier included in the warning signal to output a visual warning. The central control module 44 further controls the audio warning unit 434 to output the audio warning in one of the sound modes that corresponds to the distance to the object. A driver of the vehicle 900 may then identify a location of the object according to the visual warning, and identify the distance to the object according to the audio warning.

In summary, when implementing the ultrasonic radar system 200 provided in the disclosure, the driver of the vehicle 900 may pair the ultrasonic radar unit 34 to one of the warning areas 433, mount the ultrasonic radar unit 34 to one of the different sides of the vehicle 900 that corresponds to the one of the warning areas 433 though magnetic attraction, and mount the warning device 4 inside the cabin of the vehicle 900 to complete a setup of the ultrasonic radar system 200. The ultrasonic radar unit 34 may be mounted on one of the different sides of the vehicle 900 desired by the driver (e.g., any side of the vehicle 900 that may have a higher chance of collision, or any blind spot of the vehicle 900). The driver may also choose to pair more than one ultrasonic radar unit to more than one of the warning areas 433, and then pair the more than one ultrasonic radar unit to the warning device 4.

Since the ultrasonic radar unit 34 uses the electric power that is stored in the battery 382 and does not require electric power from the vehicle 900 itself, the ultrasonic radar unit 34 may be easily moved to another vehicle when the vehicle 900 is not in service, and the pairing setting may easily be executed again to pair the ultrasonic radar unit 34 to another warning device that is mounted on the another vehicle, thus effectively reducing an equipment cost by reusing the ultrasonic radar unit 34 on different vehicles.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An ultrasonic radar system adapted to be detachably mounted on a vehicle, the ultrasonic radar system comprising:
   an ultrasonic radar unit configured to be detachably mounted on the vehicle, and including
      an ultrasonic sensor configured to detect presence of an object within a predetermined range, and to output a sensing signal when detecting an object that is within the predetermined range;
      a first communication module;
      a motion sensing module configured to detect whether the vehicle is moving and to output a trigger signal upon detecting movement of the vehicle,
      a control module including an operation unit that is configured to be switched among a plurality of settings respectively corresponding to different sides of the vehicle and that is configured to be operated to activate a pairing function, said control module storing an identifier that is related and unique to said ultrasonic radar unit and a plurality of setting parameters that correspond respectively to the settings, said control module being configured to
         output a pairing signal using said first communication module when said operation unit activates the pairing function, where the pairing signal includes the identifier and one of the setting parameters that corresponds to one of the settings which said operation unit is currently being switched to,
         activate said ultrasonic sensor upon receiving the trigger signal from said motion sensing module, and
         output a warning signal using said first communication module upon receiving the sensing signal from said ultrasonic sensor, where the warning signal includes the identifier, and
      a solar power module configured to provide electric power to said ultrasonic sensor, said first communication module, said motion sensing module, and said control module; and
   a warning device configured to be electrically connected to said ultrasonic radar unit and to be mounted inside the vehicle, said warning device including
      a second communication module configured to wirelessly communicate with said first communication module to receive the warning signal and the pairing signal,
      a warning module including a display unit that has a plurality of warning areas, and
      a central control module storing the setting parameters that are associated respectively with the warning areas, said central control module being configured to
         when receiving the pairing signal through said second communication module, store the identifier that is included in the pairing signal, and couple the identifier to one of said warning areas that corresponds to the setting parameter included in the pairing signal, and
         upon receiving the warning signal through said second communication module from said ultrasonic radar unit, control one of said warning areas that is coupled to the identifier included in the warning signal to output a visual warning.

2. The ultrasonic radar system as claimed in claim 1, wherein said warning module further includes an audio warning unit, and said central control module is further configured to control said audio warning unit to output an audio warning upon receiving the warning signal.

3. The ultrasonic radar system as claimed in claim 2, wherein:
   said control module is further configured to analyze the sensing signal to obtain a distance to the object, and to output the warning signal to further include the distance to the object; and
   said central control module is further configured to control said audio warning unit to output the audio warning in a sound mode that corresponds to the distance to the object.

4. The ultrasonic radar system as claimed in claim 1, wherein said central control module is further configured to, when receiving the pairing signal, analyze a received signal strength indication (RSSI) of the pairing signal, and store the identifier that is included in the pairing signal and couple the identifier to one of said warning areas that corresponds to the setting parameter included in the pairing signal only when the RSSI is greater than a predetermined value.

5. The ultrasonic radar system as claimed in claim 1, wherein said operation unit includes a knob operable to be switched among a plurality of positions corresponding respectively to the settings for switching said operation unit among the settings, and a button operable to activate the pairing function.

6. The ultrasonic radar system as claimed in claim 1, wherein said motion sensing module is a gravity sensor.

7. The ultrasonic radar system as claimed in claim 1, wherein said ultrasonic radar unit further includes:
   a housing, said ultrasonic sensor, said first communication module, said motion sensing module, said control module and said solar power module being disposed on said housing; and
   a connecting unit that is disposed on said housing and that is configured to be detachably mounted on the vehicle.

8. The ultrasonic radar system as claimed in claim 7, wherein said connecting unit is detachably mounted on said vehicle by magnetic attraction.

9. The ultrasonic radar system as claimed in claim 7, wherein said solar power module includes a solar panel that is disposed on an outer surface of said housing and that is configured to convert energy of light directly into the electric power.

10. The ultrasonic radar system as claimed in claim 7, wherein said ultrasonic radar unit further includes a reflector that is dispose on an outer surface of said housing.

11. The ultrasonic radar system as claimed in claim 1, further comprising a plurality of said ultrasonic radar units, wherein said central control module is configured to
- when receiving the pairing signal through said second communication module from said control module of one of said ultrasonic radar units, store the identifier that is included in the pairing signal, and couple the identifier to one of said warning areas that corresponds to the setting parameter included in the pairing signal, and
- upon receiving the warning signal through said second communication module from one of said ultrasonic radar units, control one of said warning areas that is coupled to the identifier included in the warning signal to output the visual warning.

\* \* \* \* \*